United States Patent
Kim et al.

(10) Patent No.: US 7,894,147 B2
(45) Date of Patent: Feb. 22, 2011

(54) LENS MODULE AND ELECTRONIC APPARATUS

(75) Inventors: Woojung Kim, Tokyo (JP); Yoshiteru Kamatani, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/556,342

(22) Filed: Sep. 9, 2009

(65) Prior Publication Data

US 2010/0067130 A1    Mar. 18, 2010

(30) Foreign Application Priority Data

Sep. 17, 2008    (JP) .............................. 2008-237672

(51) Int. Cl.
*G02B 3/00* (2006.01)
(52) U.S. Cl. ..................... 359/824; 359/819; 359/811
(58) Field of Classification Search ......... 359/694–701, 359/819–824, 826, 829
See application file for complete search history.

(56) References Cited

U.S. PATENT DOCUMENTS

| | | | |
|---|---|---|---|
| 7,127,162 B2 | 10/2006 | Mano | 396/144 |
| 7,589,920 B2 * | 9/2009 | Shin et al. | 359/811 |
| 7,675,565 B2 * | 3/2010 | Cheng | 348/357 |
| 2009/0059373 A1 * | 3/2009 | Lam et al. | 359/557 |

FOREIGN PATENT DOCUMENTS

| | | |
|---|---|---|
| JP | 2768869 | 4/1998 |
| JP | 2005-157290 | 6/2005 |
| JP | 2005-300606 | 10/2005 |
| JP | 2005-352287 | 12/2005 |
| JP | 2006-039480 | 2/2006 |
| JP | 2006-276200 | 10/2006 |
| JP | 2006-301202 | 11/2006 |
| JP | 2007-074583 | 3/2007 |
| JP | 2007-097259 | 4/2007 |
| JP | 2007-139862 | 6/2007 |
| JP | 2007-206362 | 8/2007 |
| JP | 2008-072465 | 3/2008 |

* cited by examiner

*Primary Examiner*—Mohammed Hasan
(74) *Attorney, Agent, or Firm*—SNR Denton US LLP

(57) ABSTRACT

A lens module includes: an optical element focusing a subject on an imaging device; a driver moving the optical element forward and backward along the optical axis direction when electric power is applied; and a holding section holding the optical element in at least two positions along the optical axis direction when the driver moves the optical element forward and backward.

8 Claims, 13 Drawing Sheets

LENS MODULE AND ELECTRONIC APPARATUS

BACKGROUND OF THE INVENTION

1. Field of the Invention

The present invention relates to a lens module and an electronic apparatus, and particularly to a lens module having a function of moving an optical element forward and backward along the optical axis direction when electric power is applied and an electronic apparatus including a body housing to which the lens module is attached.

2. Description of the Related Art

Some cameras to be built in mobile phones and other electronic apparatus do not have an autofocus (AF) function. A camera of this type is called a fixed-focus camera and includes a lever that switches the focus position by using, for example, a cam structure between the focus position corresponding to a standard imaging mode and the focus position corresponding to a macro-imaging mode, which is, for example, used in barcode recognition. A user uses the lever to move a lens holder manually in the optical axis direction (see JP-A-2006-276200, JP-A-2006-039480, JP-A-2005-352287, JP-A-2005-300606, and JP-A-2005-157290, for example).

In a manual switching camera of this type, the user sometimes set the lens to the position corresponding to infinity by mistake in the macro-imaging mode. To solve the problem, it is necessary to provide a complicated control system (see JP-A-2008-072465, for example). Further, since the switch for the switching purpose is exposed to the outside, it is difficult to make the switch waterproof, and implementation of the switch is limited in terms of area and location, which may require a precise implementation technology (see JP-A-2007-074583, for example).

An ion-conducting polymer actuator has been proposed as a next-generation actuator that not only replaces the manual lens driving described above with electrically powered lens driving but also satisfies the demands on a camera module built in a mobile phone, such as size reduction, power saving, cost reduction, and easy assembling (see Japanese Patent No. 2,768,869, for example).

An ion-conducting polymer actuator is formed of a cation-exchanged cation exchange film containing water and electrodes joined with both surfaces of the ion exchange film. Alternatively, an ion-conducting polymer actuator is formed of a water-containing ion exchange film, electrodes joined with both surfaces of the ion exchange film, and a polymer material coated on the ion exchange film and the electrodes. In operation, applying a potential difference across the ion exchange film causes the cation exchange film or the polymer material coating to bend or deform and hence operate as an actuator.

In recent years, lens holder driving mechanisms using an ion-conducting polymer actuator of the type described above in a camera module to be built in a mobile phone or any other mobile apparatus have been proposed. Camera modules having a similar configuration have also been proposed. (See JP-A-2006-301202, JP-A-2007-206362, JP-A-2007-139862, and JP-A-2007-097259, for example).

SUMMARY OF THE INVENTION

However, when an ion-conducting polymer actuator or any other piezoelectric device is used to drive a lens, it is necessary to keep applying electric power to the ion-conducting polymer actuator in order to maintain the lens in a fixed position. In a situation in which electric power is applied for a long period, it is difficult to maintain the position due to instability of shape maintaining capability of the actuator caused by charge leakage or other factors.

In a mechanism that moves an optical element forward and backward when electric power is applied, it is desirable to provide a technology for reliably maintaining the position of the optical element.

According to an embodiment of the invention, there is provided a lens module including an optical element focusing a subject on an imaging device, a driver moving the optical element forward and backward along the optical axis direction when electric power is applied, and a holding section holding the optical element in at least two positions along the optical axis direction when the driver moves the optical element forward and backward.

In the embodiment of the invention described above, the optical element is moved forward and backward along the optical axis direction by applying electric power to the driver. The holding section then maintains the position of the optical element along the optical axis direction. That is, the holding section holds the optical element in at least two positions along the optical axis direction. Therefore, the position of the optical element can be maintained even when the electric power application to the driver is terminated.

It is preferred that the force produced by the holding section and used to hold the optical element is smaller than a driving force produced by the driver when electric power is applied thereto, whereas the holding force is greater than a restoring force of the driver produced when the electric power application to the driver is terminated. Therefore, the driving force of the driver produced when electric power is applied thereto overcomes the holding force of the holding section so as to move the position of the optical element, whereas the holding section can maintain the position of the optical element when the electric power application is terminated.

It is preferred that the driver includes a piezoelectric device the displacement direction of which is controlled by the change in polarity of the voltage applied to the driver. Therefore, controlling the polarity of the applied voltage allows the direction in which the optical element moves to be controlled.

It is preferred that the driver includes a piezoelectric device the displacement direction of which is controlled by the change in polarity of the voltage applied to the driver. Examples of the piezoelectric device may include an ion-conducting polymer actuator and a bimorph piezoelectric device.

It is preferred that the holding section includes a protrusion provided on the outer circumferential surface of the optical element that moves forward and backward or the outer circumferential surface of a holder that holds the optical element, and at least two recesses provided on the inner circumferential surface of an enclosure that houses the optical element or the holder in the positions facing the protrusion.

It is preferred that the optical element or the holder that holds the optical element is attached into a hole provided in the driver by using insert molding. It is preferred that the lens module further includes a controller controlling electric power supplied to the driver.

According to another embodiment of the invention, there is provided an electronic apparatus including a lens module including an optical element focusing a subject on an imaging device, a driver moving the optical element forward and backward along the optical axis direction when electric power is applied, and a holding section holding the optical element in at least two positions along the optical axis direction when the driver moves the optical element forward and backward, a body housing to which the lens module it attached, and an input unit provided on the body housing, the input unit receiving an instruction to supply electric power to the driver in the lens module.

In the embodiment of the invention described above, when the input unit receives an instruction, electric power is supplied to the driver in the lens module in accordance with the instruction, and the optical element can be moved forward or backward. The holding section can then hold the optical element in at least two positions along the optical axis direction. When the holding section maintains the position of the optical element, the position of the optical element is reliably maintained even when the electric power application to the driver is terminated.

According to the embodiments of the invention, in a mechanism that moves an optical element forward and backward when electric power is applied, the position of the optical cal element can be reliably maintained even when the electric power application is terminated.

DESCRIPTION OF THE PREFERRED EMBODIMENTS

Figure 1:
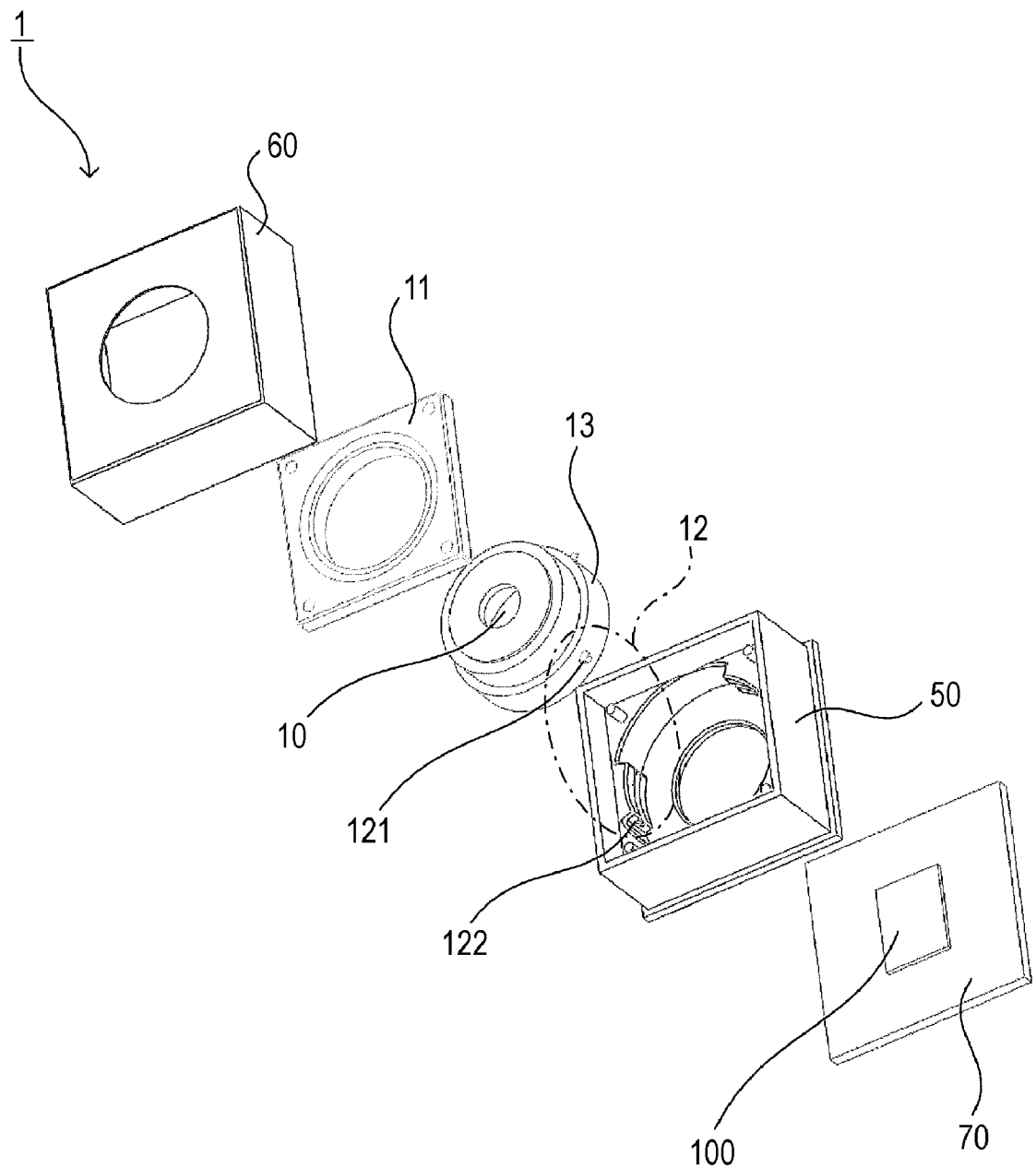
FIG. 1 is an exploded perspective view describing an example of the configuration of a lens module according to an embodiment.

The best mode (hereinafter referred to as an embodiment) for carrying out the invention will be described below. In the present embodiment, the description will be made with reference to a case where a lens module is applied to an electrically powered focus switching camera module to be built in a mobile terminal. The description will be made in the following orders:

1. Configuration of lens module

2. Examples of holding section

3. Another example of ion-conducting polymer actuator

4. Other embodiments

5. Advantages of embodiments

6. Example of electronic apparatus

1. Configuration of Lens Module

[Component Configuration]

FIG. 1 is an exploded perspective view describing an example of the configuration of a lens module according to the present embodiment. A lens module 1 according to the present embodiment includes a lens (optical element) 10 that focuses a subject on an imaging device 100, an ion-conducting polymer actuator (driver) 11 that moves the lens forward and backward along the optical axis direction when electric power is applied, and a holding section 12 that holds the lens 10 in at least two positions along the optical axis direction when the ion-conducting polymer actuator 11 moves the lens 10 forward and backward.

The present embodiment will be described with reference to a case where the ion-conducting polymer actuator 11 is used as the driver. The driver, however, may be any piezoelectric device, such as a bimorph piezoelectric device.

The lens module 1 is incorporated in an enclosure 50. A front cover 60 is placed on front side of the enclosure 50, and a substrate 70 on which the imaging device 100 is mounted is attached to the rear side of the enclosure 50.

[Front Cover]

The front cover 60 is made of a conductive stainless steel (Sus) or any other suitable material so that the front cover 60 serves as an electric ground, protects the internal structure of the lens module 1, and has adequate mechanical strength. The material of the front cover 60 is not limited to a specific one but may be any material that achieves the functions described above.

The top surface of the front cover 60 is visible from the outside after the lens module 1 is built in a mobile phone or any other electronic apparatus. Therefore, the surface of the front cover 60 desirably undergoes black plating or any other suitable processing so that the amount of reflection of ambient light is reduced. The surface treatment and the color are not limited to specific ones, but may be any method and color that achieve the above function.

[Lens Holder]

The lens 10 is held in a lens holder 13. The lens holder 13 houses not only the lens 10 but also other optical elements as necessary, such as a mirror, a prism, a diffraction grating, a beam splitter, an IR-cut filter, an ND filter, a liquid lens, a deformable mirror, an optical characteristic variable film, a polarizing film, a polarizer, and a birefringent plate.

The lens holder 13 is made of a resin or any other suitable material and, for example, molded in a die. The material of the lens holder 13 and the method for molding the same are not limited to specific ones, but may be any material and method that achieve the function as the lens holder 13. The optical response wavelength range of the optical element housed in the lens holder 13 includes all electromagnetic radiation ranging from electric radiation to high-energy photons.

The lens holder 13 may be a separate component from the optical element, or may be integrated with the lens 10 or any other optical element. Alternatively, the lens itself may also serve as a holder. The description in the present embodiment will be made by assuming that the lens holder 13 is present in one of the following forms: the lens holder 13 is a separate component from the optical element; the lens holder 13 is integrated with the optical element; and the lens itself also serves as a holder.

[Ion-Conducting Polymer Actuator]

The ion-conducting polymer actuator 11, which is an example of the driver, moves the lens holder 13 forward and backward along the optical axis direction when electric power is applied. A hole is formed in a substantially central portion of the ion-conducting polymer actuator 11, and the lens holder 13 is attached into the hole, for example, by insert molding. The lens holder 13 may be attached by fitting or with an adhesive instead of insert molding.

[Configuration of Ion-Conducting Polymer Actuator]

Figure 2:
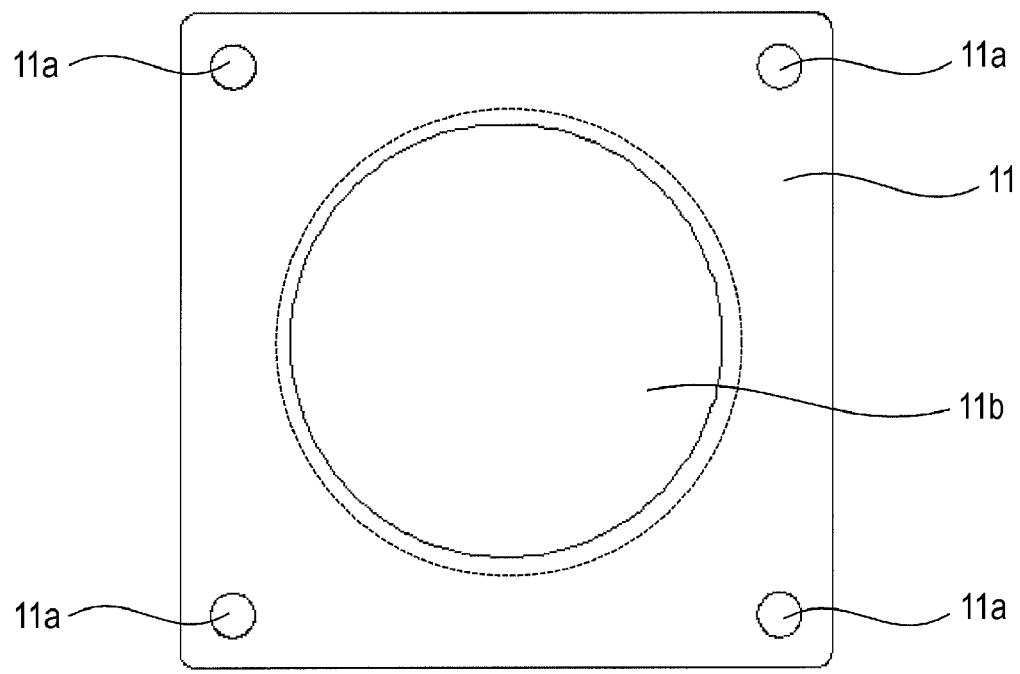
FIG. 2 is a front view of an ion-conducting polymer actuator viewed from the side facing one of its electrodes.

The shape of the ion-conducting polymer actuator 11, which is a source for driving the lens holder 13, will now be described. FIG. 2 is a front view of the ion-conducting polymer actuator viewed from the side facing one of its electrodes. The ion-conducting polymer actuator 11 has a rectangular shape in a plan view, and has holes 11a provided at the four corners, into which pins in the enclosure fit when the ion-conducting polymer actuator 11 is attached to the enclosure. The holes 11a and the pins allow the ion-conducting polymer actuator 11 to be positioned, for example, preventing it from rotating, and the outer frame of the ion-conducting polymer actuator 11 to be secured when the ion-conducting polymer actuator 11 is attached to the enclosure. The shape, number, dimension, and location of the holes 11a are not limited to those described above.

The outer frame of the ion-conducting polymer actuator 11 has a rectangular shape, and the corners of the outer frame are chamfered. This shape is intended to achieve easy attachment in consideration of the shape of the enclosure, and may be circular or polygonal in accordance with the shape of the attachment area, and the dimensions of the outer frame are not limited to specific ones.

A circular cutout 11b of the ion-conducting polymer actuator 11, which comes into contact with the lens holder, has an area to be buried in the lens holder by insert molding or a margin for a gluing purpose used when an adhesive is used to join the ion-conducting polymer actuator 11 with the lens holder. The area is indicated by the broken line in FIG. 2. The area may include a circular or polygonal sub-cutout to enhance the joining strength.

Figure 3:
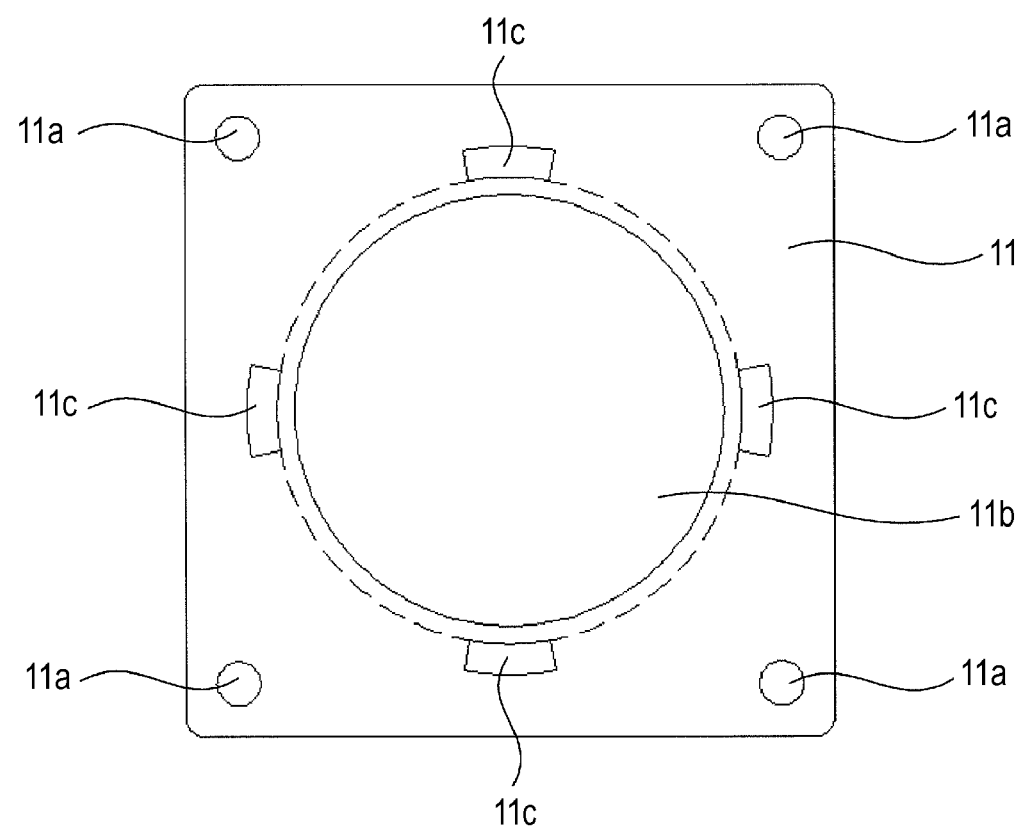
FIG. 3 is a front view of another ion-conducting polymer actuator viewed from the side facing one of its electrodes.

FIG. 3 is a front view of another ion-conducting polymer actuator viewed from the side facing one of its electrodes. The shape shown in FIG. 3, in which sub-cutouts 11c is provided in the portions to which no lens holder is attached, provides advantageous effects of improvement in the flexibility of the ion-conducting polymer actuator 11 and increase in the stroke thereof as compared to the structure shown in FIG. 2, in which no sub-cutout is provided. The number, position, and shape of the sub-cutouts 11c are not limited to those shown in FIG. 3, but any other number, position, and shape may be employed as long as they achieve the advantageous effects of improvement in the flexibility of the ion-conducting polymer actuator 11 and increase in the stroke thereof.

The shape of the cutout in the central inner frame of the ion-conducting polymer actuator 11 is intended to incorporate the lens holder. The shape of the cutout 11b conforms to the outer shape of the lens holder so that the joining operation is readily carried out. The shape and detailed dimensions of the cutout 11b are not limited to specific ones, and the shape may be triangular, rectangular, or polygonal in accordance with the shape of the joining area.

The thickness of the ion-conducting polymer actuator 11 is set in accordance with the thrust force necessary to drive the lens holder. When a voltage is applied to the ion-conducting polymer actuator 11 having the shape described above, a central portion of the parallel-plate ion-conducting polymer actuator 11 deforms into the shape shown in FIG. 4, that is, a convex or concave shape in accordance with the polarity of the voltage. At this point, the outer frame of the ion-conducting polymer actuator 11 secured in the enclosure serves as a fulcrum, and the inner frame joined with the lens holder serves as a point of action. The lens holder, that is, the lens is therefore linearly moved in the optical axis direction.

[Holding Section]

As shown in FIG. 1, protrusions 121 are provided on the outer circumferential surface of the lens holder 13. Each of the protrusions 121 is disposed in the position facing at least two recesses 122 formed on the inner surface of the enclosure 50. For example, the number of the protrusions 121 is three, and the three protrusions 121 are disposed on the outer circumferential surface of the circular lens holder 13, for example, at angular spacings of 120 degrees. Each of the protrusions 121 on the lens holder 13 and the corresponding recesses 122 in the enclosure 50 form the holding section 12.

The mechanism formed of the holding section 12 holds the lens holder 13 driven by the ion-conducting polymer actuator in a specific position along the optical axis direction. In this way, the focus position of the lens 10 is guided with precision and reproducibility, and the attitude of the lens is maintained with respect to the optical axis direction for a long period.

Specifically, when the ion-conducting polymer actuator moves the lens holder 13 forward or backward along the optical axis direction, each of the protrusions 121 on the lens holder 13 gets in one of the corresponding recesses 122 in the enclosure 50, whereby the position of the lens holder 13 is maintained. That is, when a voltage is applied to the ion-conducting polymer actuator 11, the lens holder 13 is moved along the optical axis direction in accordance with the amount of deformation of the ion-conducting polymer actuator 11, and each of the protrusions 121 on the lens holder 13 travels over the projection between the corresponding two recesses 122 in the enclosure 50 and gets in the adjacent recess 122.

The force produced by the holding section 12 and then used to hold the lens holder (including the optical element) 13 is smaller than the driving force produced by the ion-conducting polymer actuator 11 when electric power is applied thereto, whereas the holding force is greater than a restoring force of the ion-conducting polymer actuator 11 produced when the electric power application is terminated. Therefore, when electric power is applied to the ion-conducting polymer actuator 11, the driving force thereof overcomes the holding force of the holding section 12 to shift the position of the lens holder 13, and when the electric power application is terminated, the holding section 12 can maintain the position of the lens holder 13.

In the present embodiment, each of the protrusions 121 formed on the lens holder 13 and the corresponding recesses 122 formed in the enclosure 50 form the holding section 12. Alternatively, the recesses may be formed on the lens holder 13 and the protrusions may be formed in the enclosure 50. Further, in the present embodiment, while the protrusions 121 and the recesses 122, which form the holding sections 12, are formed at three locations on the outer circumferential surface of the lens holder 13 and the inner surface of the enclosure 50, respectively, the number and location of the protrusions 121 and the recesses 122 are not limited to specific ones, but may be any number and location that allow the lens holder 13 to be guided to a specific position with precision and reproducibility and the attitude of the lens holder 13 to be maintained with respect to the optical axis direction for a long period.

[Enclosure]

Figure 5:
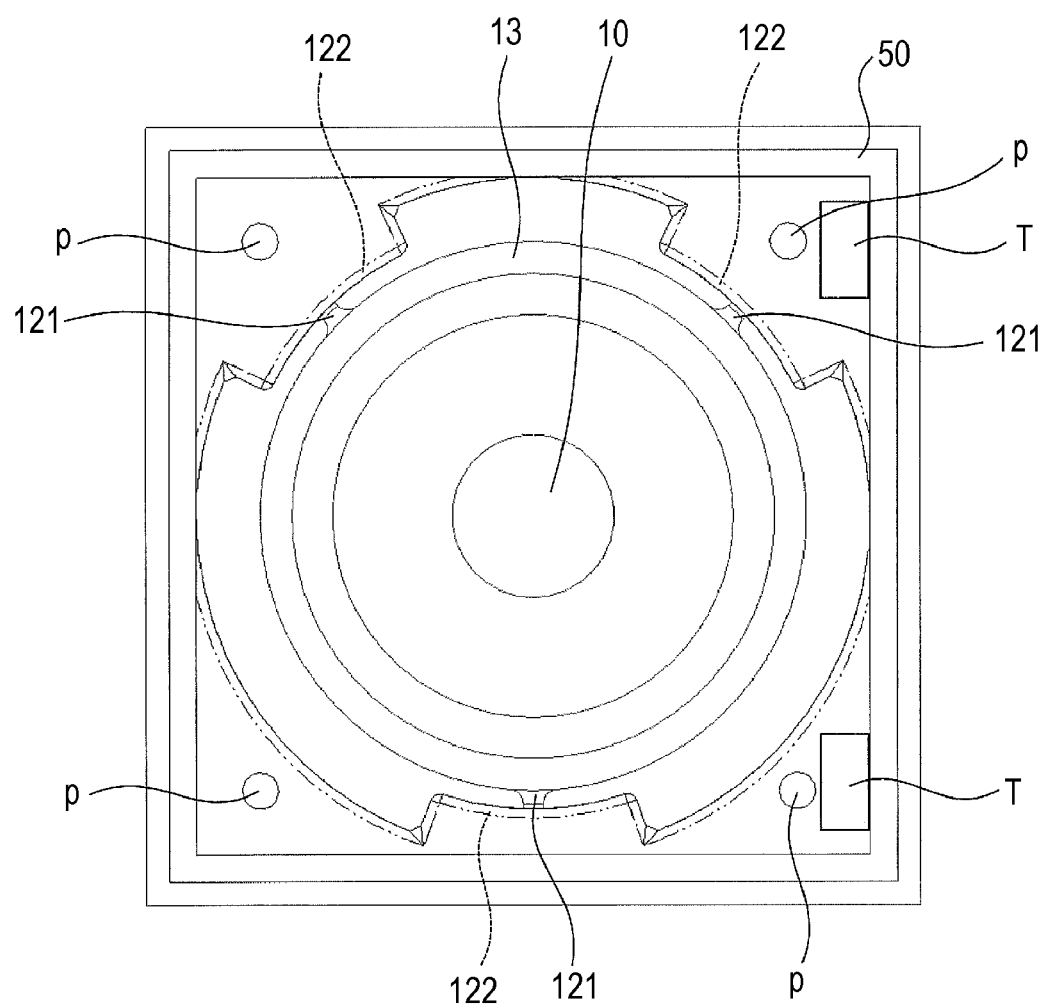
FIG. 5 is a top view showing an enclosure to which a lens holder is attached when viewed in the direction of incident light.

FIG. 5 is a top view showing the enclosure to which the lens holder is attached when viewed in the direction of incident light. The enclosure 50 includes electric power supply terminals T that are insert-molded in the positions where the terminals T come into contact with the ion-conducting polymer actuator. The terminals T extend along the side wall of the enclosure 50 and electrically communicate with the lower end thereof, where the terminals T come into contact with terminals on the substrate 70 (see FIG. 1) when the substrate is attached to the enclosure 50. In the example shown in FIG. 5, while the terminals T are formed at both corners of one side, the positions where the terminals are disposed, the shape of the terminals, and the material of the terminals are not limited to specific ones, but any position, shape, and material may be employed as long as they achieve the electric power supply function.

Although not illustrated, a terminal having an electric grounding function may be added as necessary. Pins P are provided at the inner four corners of the enclosure 50. The pins P join with the holes formed at the four corners of the ion-conducting polymer actuator, secure the ion-conducting polymer actuator, and prevent the ion-conducting polymer actuator from rotating. The number, shape, and dimension of the pins P are not limited to specific ones, but any number, shape, and dimension of the pins may be employed as long as they achieve the functions of securing the ion-conducting polymer actuator and preventing it from rotating.

[Imaging Device]

As shown in FIG. 1, the imaging device 100 is a device using a photoelectric conversion-type photodiode or a photoelectric conversion-type photoconductor, and any charge transfer method may be used and an electric signal processing function may or may not be provided as long as the device has a photoelectric conversion function. The imaging device 100 is not limited to a photon responsive imaging device but may be a heat responsive imaging device. The optical response wavelength range of the imaging device 100 is not limited to visible light but includes all electromagnetic radiation ranging from electric radiation to high-energy photons. A wiring layer in the imaging device 100 desirably includes a circuit (controller) that switches the polarity of the voltage applied to the actuator. The controller may be built in the imaging device 100, or may be mounted on the substrate 70 as a separate circuit.

[Substrate]

The substrate 70 desirably has a variety of components mounted thereon, for example, not only the imaging device 100 but also a capacitor, a resistor, a memory, and a transistor that are necessary for electric signal processing, and a driver for switching the polarity of the voltage applied to the actuator. Pads to be connected with a flexible substrate or a socket, which is an external interface, are formed on the rear surface of the substrate 70. The number of the pads and the shape of each of the pads are not limited to specific ones, and any number and shape may be employed as long as they achieve the connection function. The flexible substrate, which serves as an interface to the outside, may be integrated with the substrate 70.

The imaging device 100 and the substrate 70 are joined with each other, for example, with an adhesive. They are wired to each other with bonding wires having a charge transfer path function or electrically connected to each other by using face-down bonding via pads or other suitable components.

[Assembling Procedure]

Figure 6:
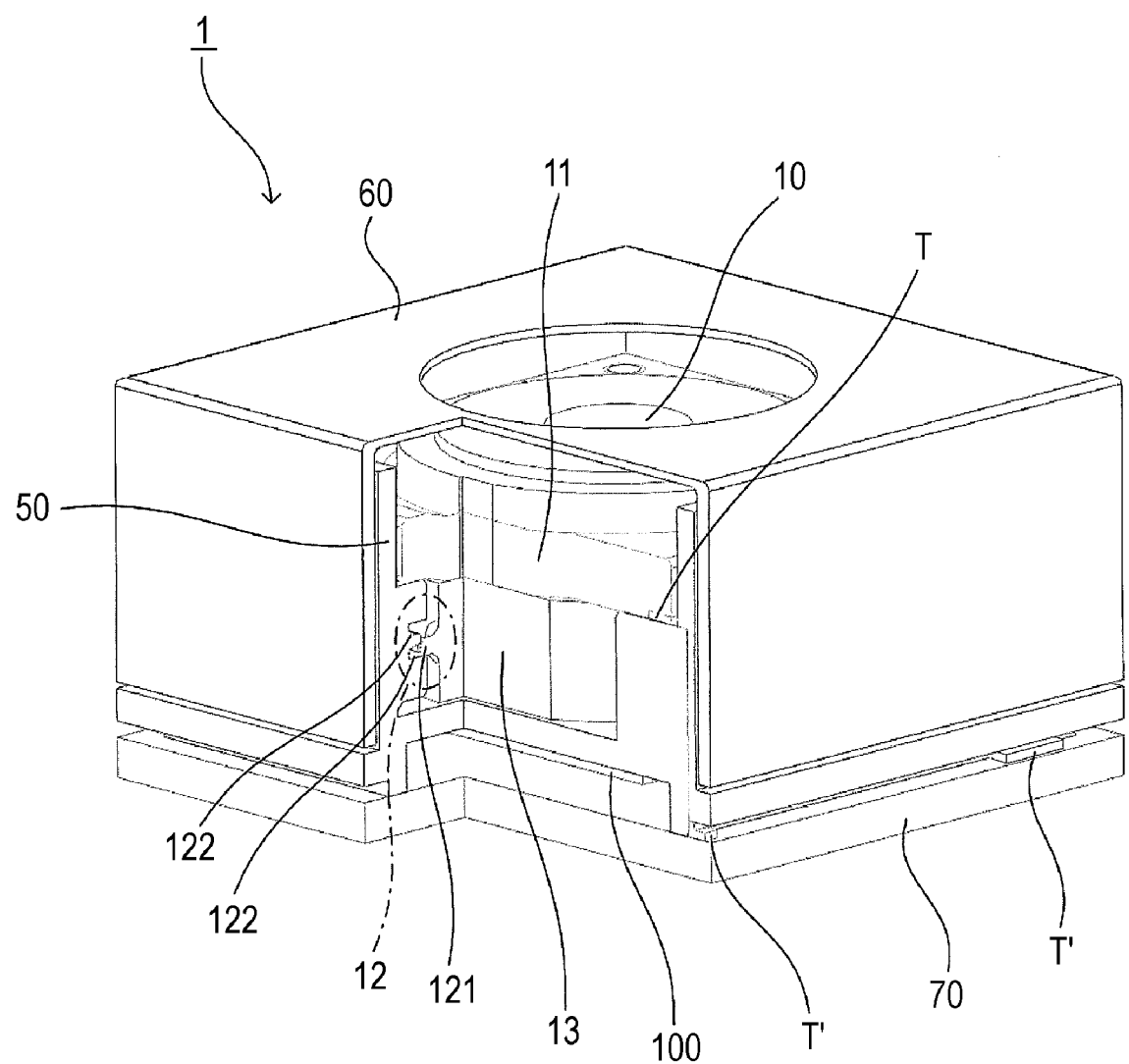
FIG. 6 shows an assembled lens module.

FIG. 6 shows an assembled lens module and is a partial cutaway view showing a cross-section of a key internal portion. The assembling procedure will be described below with reference to FIGS. 6 and 1. First, insert molding is carried out in such a way that the ion-conducting polymer actuator 11 comes into contact with a stepped portion of the lens holder 13. When an adhesive is used to carry out the joining operation, the adhesive is applied to the stepped portion of the lens holder 13, and the ion-conducting polymer actuator 11, the inner diameter of which has been formed in accordance with a small-diameter portion of the lens holder 13, is attached to the lens holder 13. The adhesive is then cured.

The lens holder 13 with which the ion-conducting polymer actuator 11 has been joined is then incorporated in the enclosure 50. In the incorporation operation, the protrusions 121 formed on the outer circumferential surface of the lens holder 13 are first positioned to be out of phase with, that is, not to interfere with the recess/projection structures formed on the inner wall of the enclosure 50. In this state, the lens holder 13 is pushed into the enclosure 50. In this process, although the four corners of the ion-conducting polymer actuator 11, the outer frame of which has a rectangular shape, interfere with the frame of the enclosure 50, no problem will occur because the ion-conducting polymer actuator 11 has flexibility.

When the protrusions 121 formed on the outer circumferential surface of the lens holder 13 reach the recess/projection structures formed on the inner wall of the enclosure 50, the lens holder 13 is rotated so that the protrusions 121 on the lens holder 13 get in, that is, are in phase with the recesses 122 of the projection/recess structures in the enclosure 50. At the same time, the pins P formed in the enclosure 50 are allowed to fit in the holes 11a provided at the four corners of the ion-conducting polymer actuator 11. The pins P and the holes 11a at the four corners are then glued with an adhesive.

Thereafter, the front cover 60 is placed on the enclosure 50 and joined therewith with an adhesive or any other suitable fixing method. The substrate 70 on which the imaging device 100 is mounted is then attached to the bottom of the enclosure 50. To align the imaging device 100 with the optical axis of the lens 10, the operator desirably adjusts the X/Y/Z positional relationship while checking images. Alternatively, a specific mark may be provided on the enclosure 50 or the substrate 70, and the alignment may be performed based on mechanical accuracy.

Electric power supply terminals T' are insert-molded on the lower end of the enclosure 50. The electric power supply terminals T' electrically communicate with the terminals T (see FIG. 5) on the surface of the internal stepped portion in the enclosure 50 via wiring lines embedded in the enclosure 50. When the ion-conducting polymer actuator 11 is attached to the enclosure 50, the terminals T come into contact with terminals of the ion-conducting polymer actuator 11, which in turn electrically communicate with the electric power supply terminals T' located on the lower end of the enclosure 50.

The electric power supply terminals T' insert-molded on the enclosure 50 are desirably joined with the terminals on the substrate 70 by soldering or with a conductive adhesive, but any joining method may be used as long as the method achieves the conduction.

[Circuit for Driving Ion-Conducting Polymer Actuator]

Figure 7:
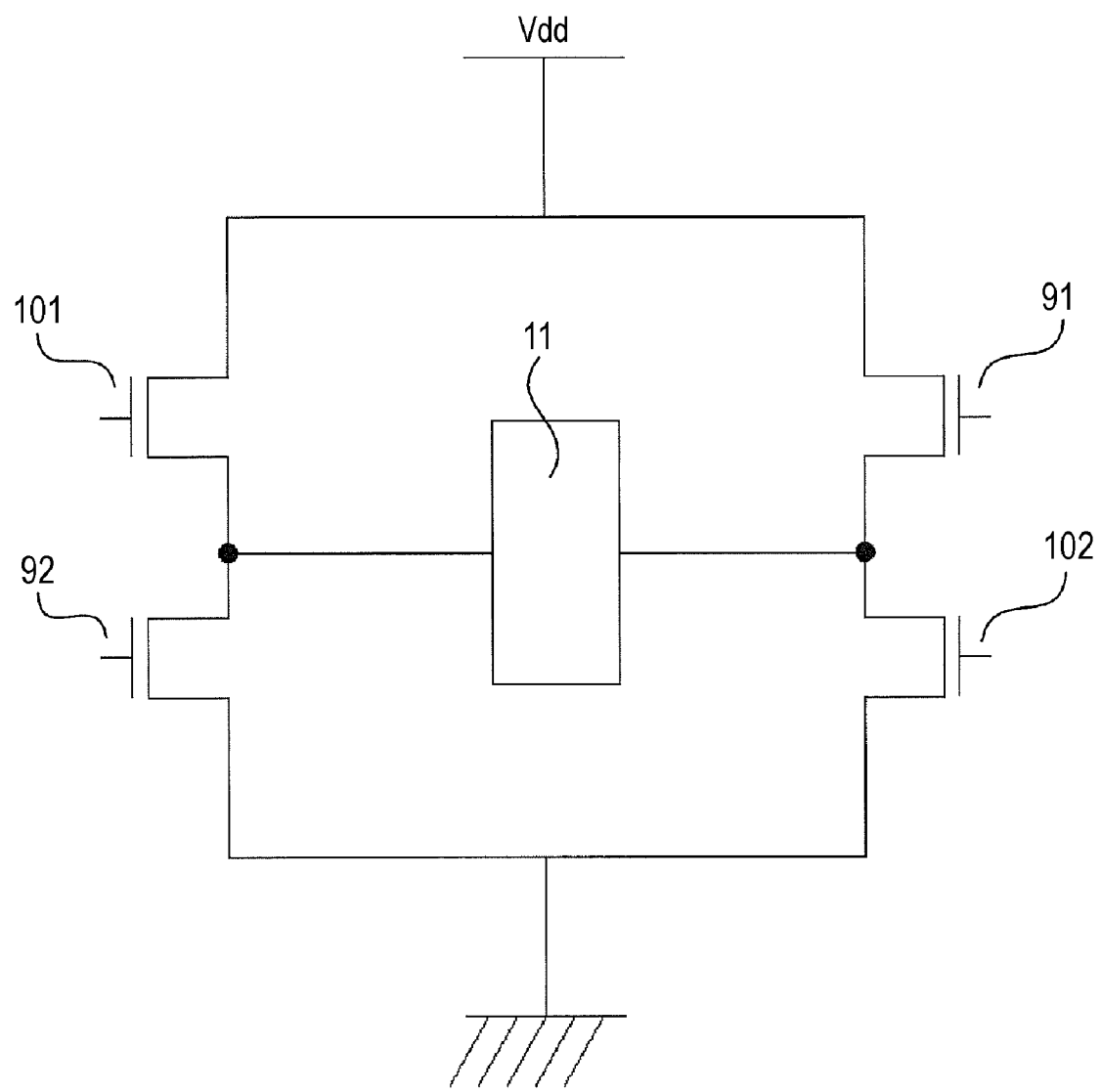
FIG. 7 describes a circuit for driving the ion-conducting polymer actuator.

FIG. 7 describes a circuit for driving the ion-conducting polymer actuator. Four FETs (Field Effect Transistors) 91, 92, 101, and 102 are connected between a power source Vdd and a ground. Among the four FETs, the two FETs 91 and 101 are connected in parallel on the power source side with respect to the ion-conducting polymer actuator, whereas the other two FETs 92 and 102 are connected in parallel on the ground side with respect to the ion-conducting polymer actuator.

[Driving Operation]

To shift the position of the lens holder 13, a user instructs so by using a software- or hardware-based input unit. The instruction received by the input unit is sent to, for example, the controller built in the imaging device 100. The controller controls the current conducted through the FETs based on the instruction.

For example, when the lens holder 13 is located in a focus position corresponding to infinity, and the user wants to move the lens holder 13 to a focus position corresponding to macro-imaging, the user instruct so (hereinafter referred to as a "macro-imaging mode") and the input unit receives the instruction. The instruction received by the input unit is sent to, for example, the controller built in the imaging device 100. The controller controls the current conducted through the FETs based on the instruction.

Figure 4:
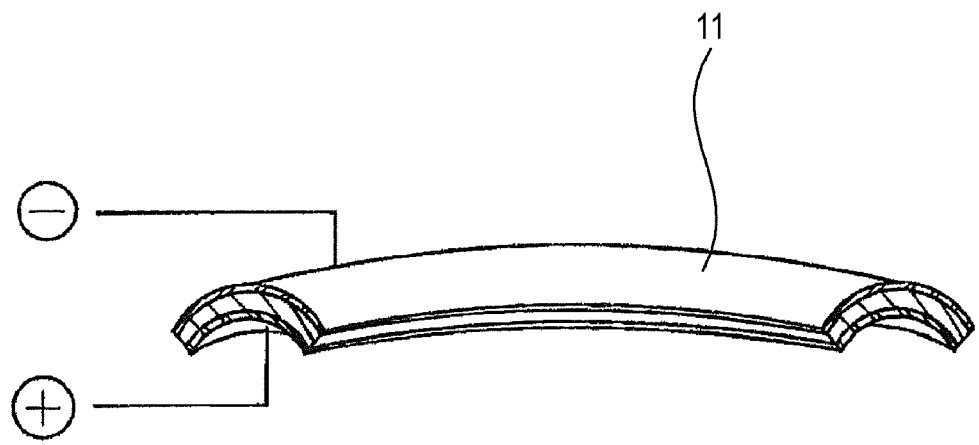
FIG. 4 describes how the ion-conducting polymer actuator deforms.

When the instruction is transition to the macro-imaging mode, the controller controls the power source to turn on the FETs 91 and 92 and turn off the FETs 101 and 102 so that the ion-conducting polymer actuator 11 produces the displacement shown in FIG. 4. The lens holder 13 is therefore moved to the focus position corresponding to the macro-imaging.

Thereafter, when the user wants to move the lens holder 13 in the focus position corresponding to the macro-imaging to the focus position corresponding to infinity, the user instructs so (hereinafter referred to as a "normal mode") and the input unit receives the instruction. The instruction received by the input unit is sent to, for example, the controller built in the imaging device 100. The controller controls the current conducted through the FETs based on the instruction.

When the instruction is transition to the normal mode, the controller controls the power source to turn on the FETs 101 and 102 and turn off the FETs 91 and 92. The polarity of the applied voltage in this case is opposite to the polarity used in the transition to the macro-imaging mode, and the shape of the displaced ion-conducting polymer actuator 11 is the inverse of that shown in FIG. 4. The lens holder is therefore moved to the focus position corresponding to infinity.

The controller can drive the FETs in the manner described above irrespective of the position of the lens holder 13. For example, when the issued instruction is transition to the normal mode, the FETs are driven in the manner used for the transition to the normal mode even when the lens holder 13 has been already held in the position corresponding to the normal mode. Conversely, when the issued instruction is transition to the macro-imaging mode, the FET are driven in the manner used for the transition to the macro-imaging mode even when the lens holder 13 has been already held in the position corresponding to the macro-imaging mode. The procedure described above saves the controller from having to detect the current position of the lens holder in preparation for the following control.

[Action of Holding Section]

Figure 8A:
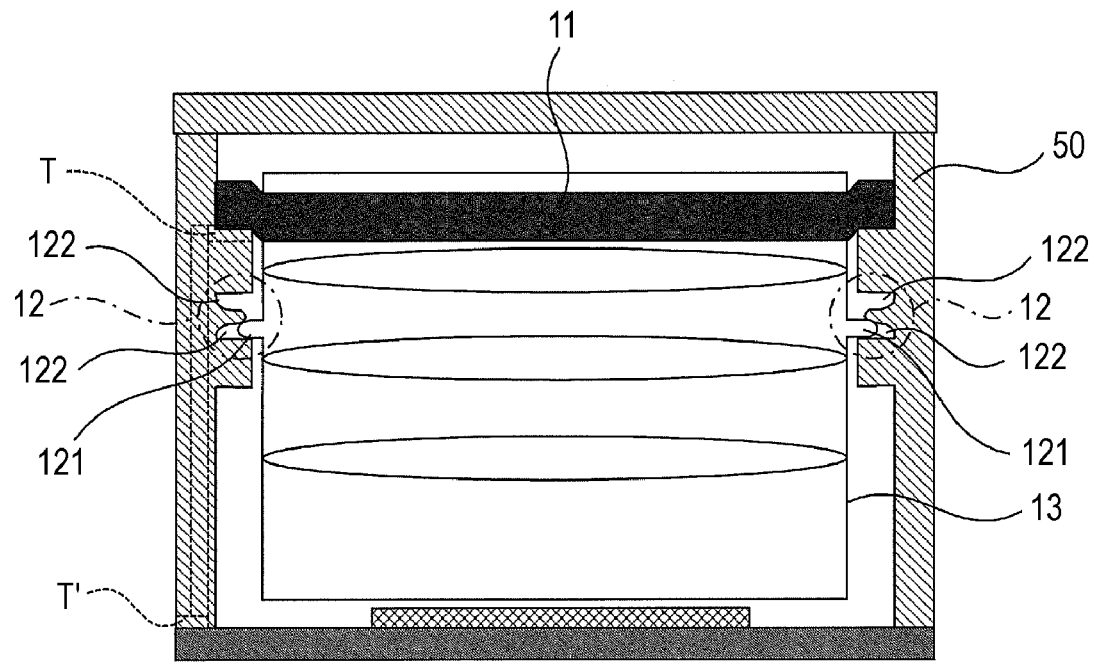
FIGS. 8A and 8B are schematic cross-sectional views describing the action of a holding section.
Figure 8B:
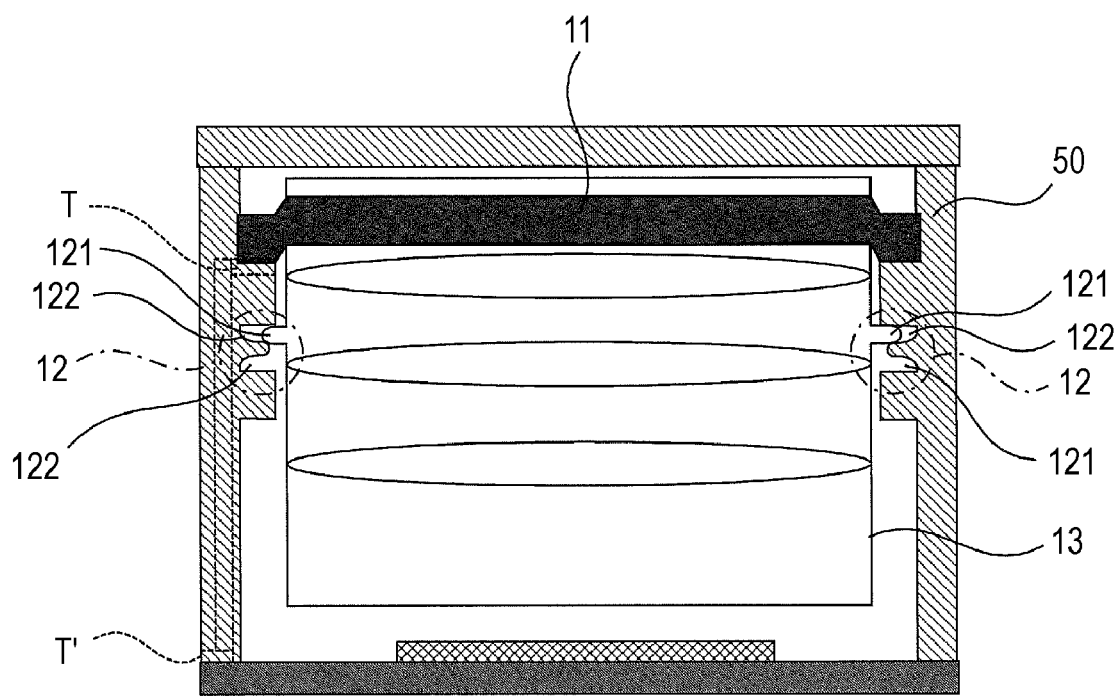

FIGS. 8A and 8B are schematic cross-sectional views describing the action of the holding section. FIG. 8A shows the lens holder held in the position corresponding to the normal mode, and FIG. 8B shows the lens holder held in the position corresponding to the macro-imaging mode. When the controller carries out the transition to the normal mode in accordance with the driving operation having been described above, the ion-conducting polymer actuator 11 drives the lens holder 13 and moves it to the position shown in FIG. 8A. In this state, each of the protrusions 121 on the lens holder 13 gets in the lower recess 122 of the corresponding two recesses 122 in the enclosure 50, and the lens holder 13 is held in that position. Even when the electric power application to the ion-conducting polymer actuator 11 is terminated with the lens holder 13 thus held, the lens holder 13 is held in the same position because the holding force of the holding section 12 exceeds the restoring force of the ion-conducting polymer actuator 11.

When the controller carries out the transition to the macro-imaging mode, the ion-conducting polymer actuator 11 drives the lens holder 13 and moves it to the position shown in FIG. 8B. When the lens holder 13 is moved from the position corresponding to the normal mode to the position corresponding to the macro-imaging mode, each of the protrusions 121 on the lens holder 13 in the lower recess 122 in the enclosure 50 travels over the projection and gets in the upper recess 122. That is, the position of the lens holder 13 is switched because the driving force acting on the lens holder 13 when electric power is applied to the ion-conducting polymer actuator 11 exceeds the holding force of the holding section 12. Once the lens holder 13 is held, the lens holder 13 is held in the same position even when the electric power application to the ion-conducting polymer actuator 11 is terminated in the above state, because the holding force of the holding section 12 exceeds the restoring force of the ion-conducting polymer actuator 11.

2. Examples of Holding Section

FIGS. 9 to 13 are partial cross-sectional views describing examples of the configuration of the holding section. The structures of the enclosure and the lens holder may be swapped with each other, provided that each of the structures of the holding section described below allows the lens holder to be guided to a specific position and the position to be stably maintained.

Figure 9:
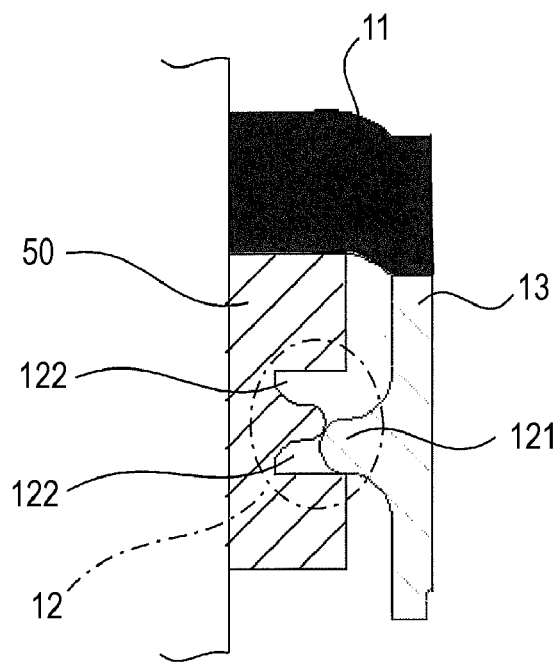
FIG. 9 is a partial cross-sectional view describing an (first) example of the configuration of the holding section.

FIG. 9 shows an example in which the recesses 122 (recess/projection), which are part of the holding sections 12, on the inner wall of the enclosure 50 are formed by die molding. In FIG. 9, while the tip of the projection between each pair of the recesses 122 on the inner wall of the enclosure 50 and the tip of the corresponding protrusion 121 on the lens holder 13 have cylindrical shapes, the shapes may be formed of a polygon or a free-form curve in order to optimize the force for holding the lens holder 13 and the force for driving the lens holder 13, and the detailed dimensions are not limited to specific ones.

Figure 10:
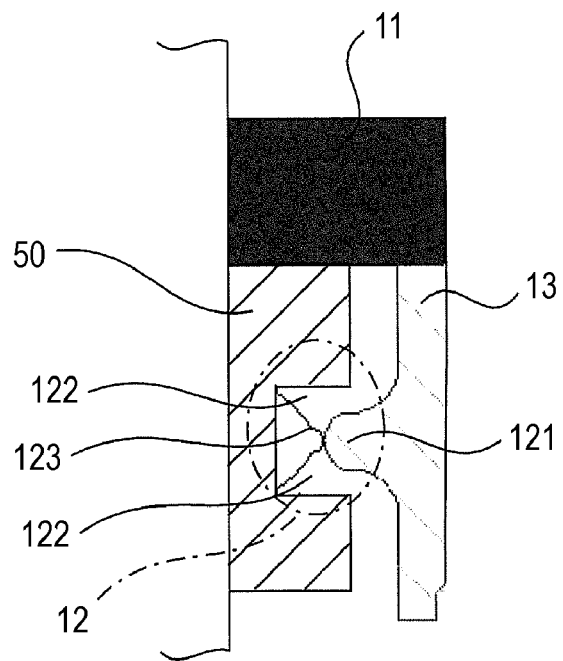
FIG. 10 is a partial cross-sectional view describing another (second) example of the configuration of the holding section.

FIG. 10 shows an example in which each of the recess/projection portions, which are part of the holding sections 12, on the inner wall of the enclosure 50 is formed of a flat spring 123. The angled flat spring 123 forms the recesses 122 on both sides of the angled portion of the flat spring 123, and the corresponding protrusion 121 on the lens holder 13 gets in one of the recesses 122. In FIG. 10, while the tip of the central projection of the flat spring 123 disposed on the inner wall of the enclosure 50 and the tip of the protrusion 121 on the lens holder 13 have cylindrical shapes, the shapes may be formed of a polygon or a free-form curve in order to optimize the force for holding the lens holder 13 and the force for driving the lens holder 13. Further, the reaction force and the detailed dimensions of the flat spring 123 are not limited to specific ones.

Figure 11:
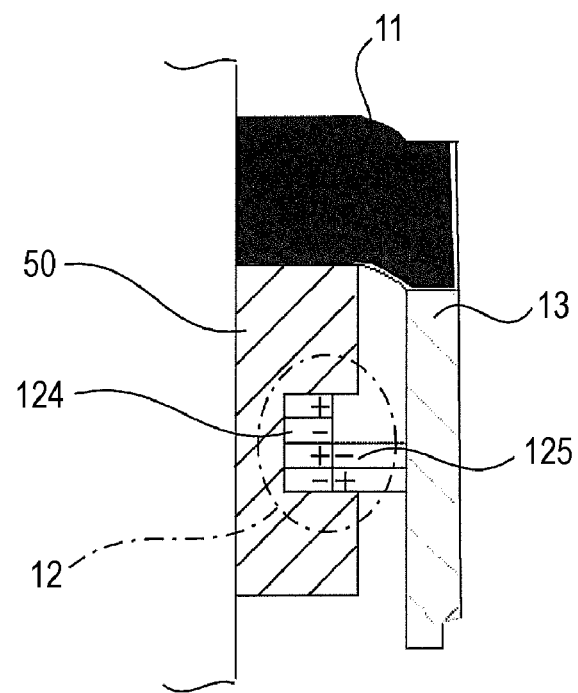
FIG. 11 is a partial cross-sectional view describing another (third) example of the configuration of the holding section.

FIG. 11 shows an example in which each of the holding sections 12 is formed of magnets 124 on the inner wall of the enclosure 50. In FIG. 11, the polarities of the four magnets 124 disposed on the inner wall of the enclosure 50 are sequentially changed from the top as follows: (+)→(−)→(+)→(−), and the polarities of two magnets 125 on the lens holder 13 are sequentially changed from the top as follows: (−)→(+). In each of the positions where the lens holder 13 is held, the magnetic polarities of the magnets 124 on the inner wall of the enclosure 50 are opposite to the magnetic polarities of the magnets 125 on the lens holder 13, whereby an attractive force is produced. On the other hand, in a position between the positions where the lens holder 13 is held, the magnetic polarities of the magnets 124 on the inner wall of the enclosure 50 are the same as the magnetic polarities of the magnets 125 on the lens holder 13, whereby a repulsive force is produced. It is noted that the order of the polarities of the magnets 124 and 125 may be reversed. To optimize the force for holding the lens holder 13 and the force for driving the lens holder 13, the shape, type, magnetic force, and detailed dimensions of the magnets 124 and 125 are not limited to specific ones.

Figure 12:
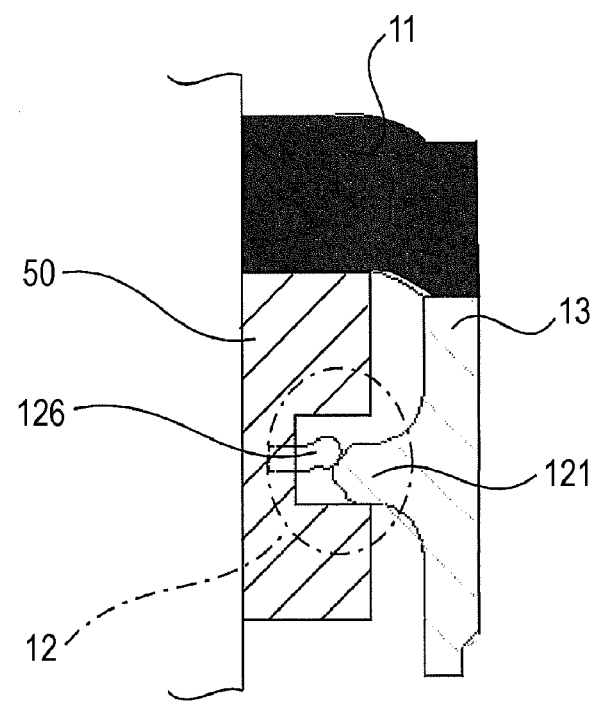
FIG. 12 is a partial cross-sectional view describing another (fourth) example of the configuration of the holding section.

FIG. 12 shows an example in which each of the recess/projection portions made of resilient elastomer on the inner wall of the enclosure 50 forms the corresponding holding section 12. An elastomer protrusion 126 disposed on the inner wall of the enclosure 50 always interferes with the corresponding protrusion 121 formed on the lens holder 13, and the protrusion 126 on the inner wall of the enclosure 50 is displaced on either of the two sides. The restoring force that is produced by the resilience of the elastomer and attempts to bring the protrusion 126 back to the original position holds the lens holder 13 in a specific position. To optimize the force for holding the lens holder 13 and the force for driving the lens holder 13, the shapes of the tips of the protrusions 126 and 121, the elastomer material of the protrusions 126, and the detailed dimensions of the protrusions 126 and 121 are not limited to specific ones.

Figure 13:
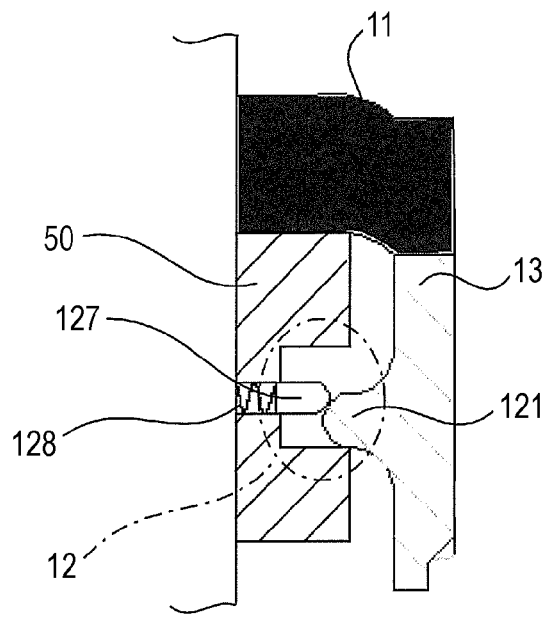
FIG. 13 is a partial cross-sectional view describing another (fifth) example of the configuration of the holding section.

FIG. 13 shows an example in which each of the recess/projection portions formed of a spring probe 127 through the inner wall of the enclosure 50 forms the corresponding holding sections 12. The spring probe 127 disposed through the inner wall of the enclosure 50 is protruded outwardly by an urging force of a spring 128, whereas being retracted in the direction perpendicular to the side surface when the lens holder 13 passed by. After the corresponding protrusion 121 on the lens holder 13 passes by, the spring probe 127 is pushed out and maintains the position of the lens holder 13. To optimize the force for holding the lens holder 13 and the force for driving the lens holder 13, the shape of the tip of the spring probe 127, the reaction force of the spring 128, and the detailed dimensions of the shape of the spring probe 127 are not limited to specific ones.

3. Another Example of Ion-Conducting Polymer Actuator

Figure 14:
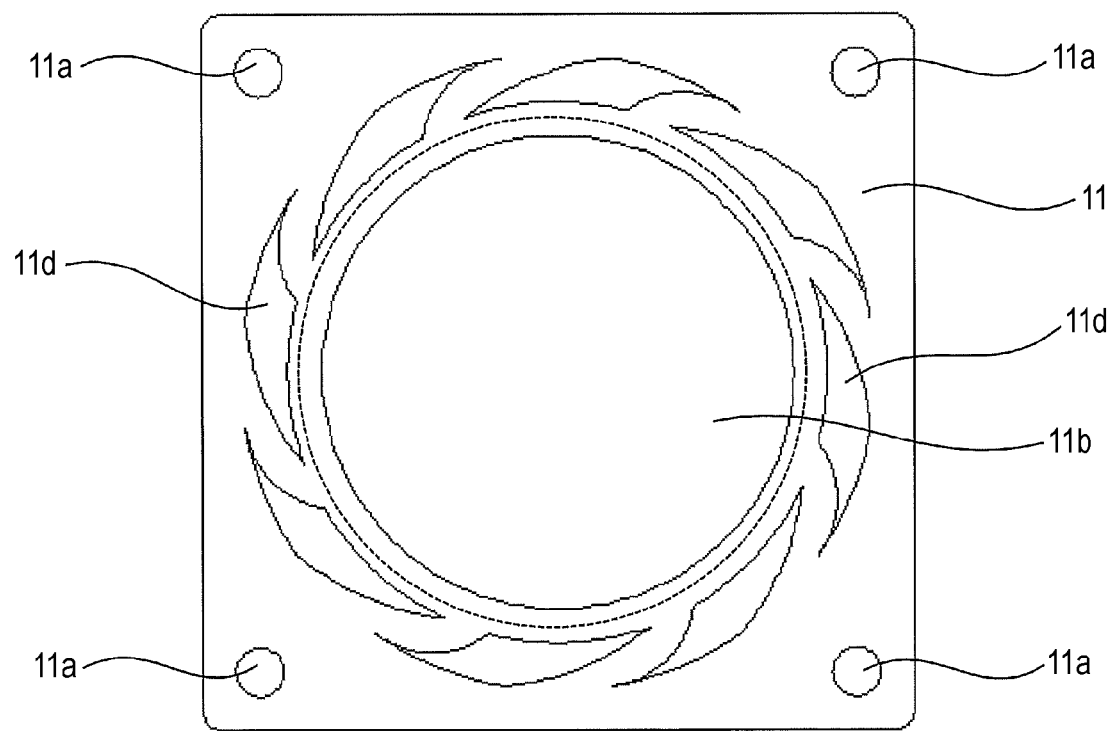
FIG. 14 is a front view of an ion-conducting polymer actuator according to another example viewed from the side facing one of its electrodes.

Another example of the ion-conducting polymer actuator will next be described. FIG. 14 is a front view of an ion-conducting polymer actuator according to another example viewed from the side facing one of its electrodes. The ion-conducting polymer actuator 11 has a rectangular shape in a plan view and has holes 11a provided at the four corners, into which pins in the enclosure fit when the ion-conducting polymer actuator 11 is attached to the enclosure. The holes 11a and the pins allow the ion-conducting polymer actuator 11 to be positioned, for example, preventing it from rotating, and the outer frame of the ion-conducting polymer actuator 11 to be secured when the ion-conducting polymer actuator 11 is attached to the enclosure. The shape, number, dimension, and location of the holes 11a are not limited to those described above.

The outer frame of the ion-conducting polymer actuator 11 has a rectangular shape, and the corners of the outer frame are chamfered. The shape is intended to achieve easy attachment in consideration of the shape of the enclosure, and may be circular or polygonal in accordance with the shape of the attachment area, and the dimensions of the outer frame are not limited to specific ones.

A circular cutout 11b of the ion-conducting polymer actuator 11, which comes into contact with the lens holder, has an area to be buried in the lens holder in an insert molding process or a margin for a gluing purpose used when an adhesive is used to join the ion-conducting polymer actuator 11 with the lens holder. The area is indicated by the broken line in FIG. 14. The area may include a circular or polygonal sub-cutout to enhance the joining strength (see FIG. 3).

The ion-conducting polymer actuator 11 has sub-cutouts 11d so that spiral arms are formed in the portion other than the central circular cutout. When a voltage to be applied to the ion-conducting polymer actuator 11 so that the displacement shown in FIG. 4 is produced, the spiral arms produce a torque along the central portion of the ion-conducting polymer actuator 11. The ion-conducting polymer actuator 11 is thus displaced upward or downward while being rotated. In this process, the lens holder fixed to the central portion of the ion-conducting polymer actuator 11 is simultaneously displaced upward or downward while being rotated.

The shape of a cutout 11b in the central inner frame of the ion-conducting polymer actuator 11 is intended to incorporate the lens holder. The shape of the cutout 11b conforms to the outer shape of the lens holder so that the joining operation is readily carried out. Therefore, the shape and detailed dimensions of the cutout 11b are not limited to specific ones, and the shape may be triangular, rectangular, or polygonal in accordance with the shape of the joining area.

The thickness of the ion-conducting polymer actuator 11 is set in accordance with the thrust force necessary to drive the lens holder. When a voltage is applied to the ion-conducting polymer actuator 11 having the shape described above, a central portion of the parallel-plate ion-conducting polymer actuator 11 deforms into the shape shown in FIG. 4, that is, a convex or concave shape in accordance with the polarity of the voltage. At this point, the outer frame of the ion-conducting polymer actuator 11 secured in the enclosure serves as a fulcrum, and the inner frame joined with the lens holder serves as a point of action. The lens holder, that is, the lens is therefore rotated around the optical axis and linearly moved in the optical axis direction.

Figure 15:
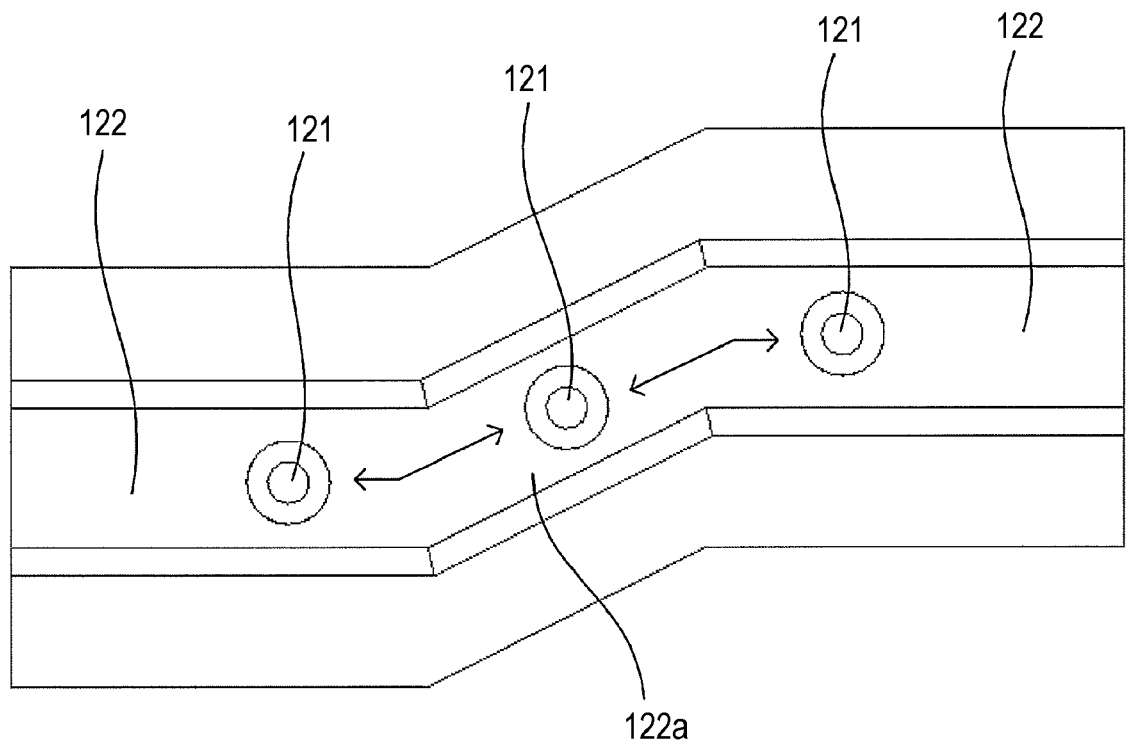
FIG. 15 is a front view describing recesses.

Using the ion-conducting polymer actuator 11 allows the lens holder to rotate around the optical axis and linearly move in the optical axis direction. To this end, the enclosure-side recesses, which the protrusion that is provided on the outer circumferential surface of the lens holder and part of the holding section gets into, have the shape shown in FIG. 15. FIG. 15 is a front view describing the recesses designed for the ion-conducting polymer actuator according to the present example. That is, an inclined path 122a is provided between the upper and lower recesses 122 for maintaining the position of the lens holder. The protrusion 121 formed on the outer circumferential surface of the lens holder moves between the upper or lower recess 122 along the path 122a while rotating at the same time.

The recess 122 according to any of the examples having been described above is provided at both ends of the inclined path 122a, whereby a force for holding the lens holder is produced and the stroke in the up/down direction is adjusted. The mechanism described above guides the lens holder driven by the ion-conducting polymer actuator to a specific focus position with precision and reproducibility, and maintains the attitude of the lens holder with respect to the optical axis direction for a long period.

In the present example, while the protrusion 121 is formed on the lens holder 13 and the recesses 122 and the inclined path 122a are formed in the enclosure 50, the recesses and the inclined path may be formed on the lens holder 13 and the protrusion may be formed in the enclosure 50. Further, it is assumed in the present example that three holding sections shown in any of FIGS. 9 to 13 are formed on both ends of the inclined path 122a between the outer circumferential surface of the lens holder and the inner wall of the enclosure. However, the number and location of the holding sections are not limited to specific ones, but any number and location may be employed as long as they achieve the function of guiding the lens holder to a specific focus position with precision and reproducibility and maintaining the attitude of the lens holder with respect to the optical axis direction for a long period.

4. Other Embodiments

Figure 16:
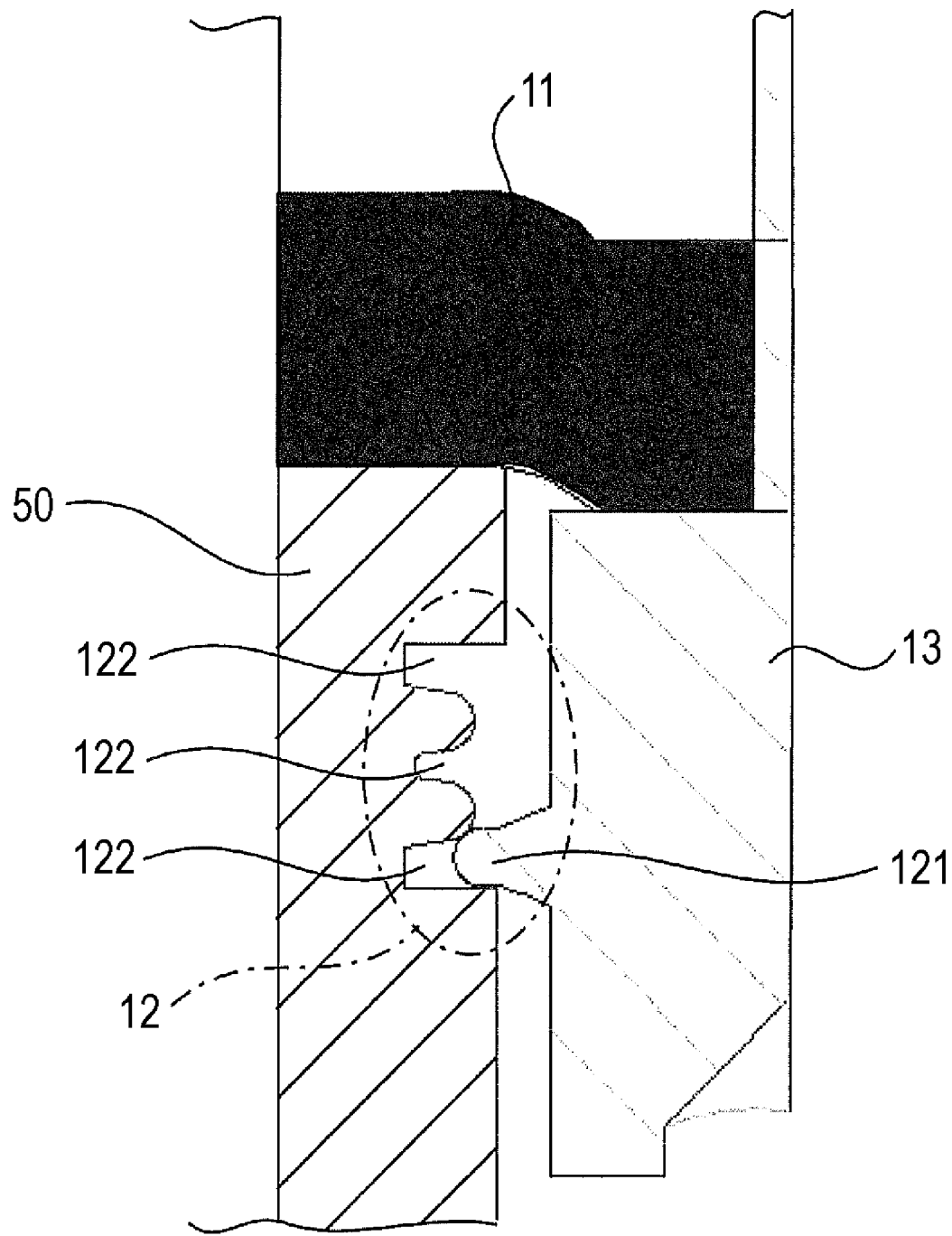
FIG. 16 is a partial cross-sectional view showing an example in which the holding section has multiple holding positions.
Figure 17:
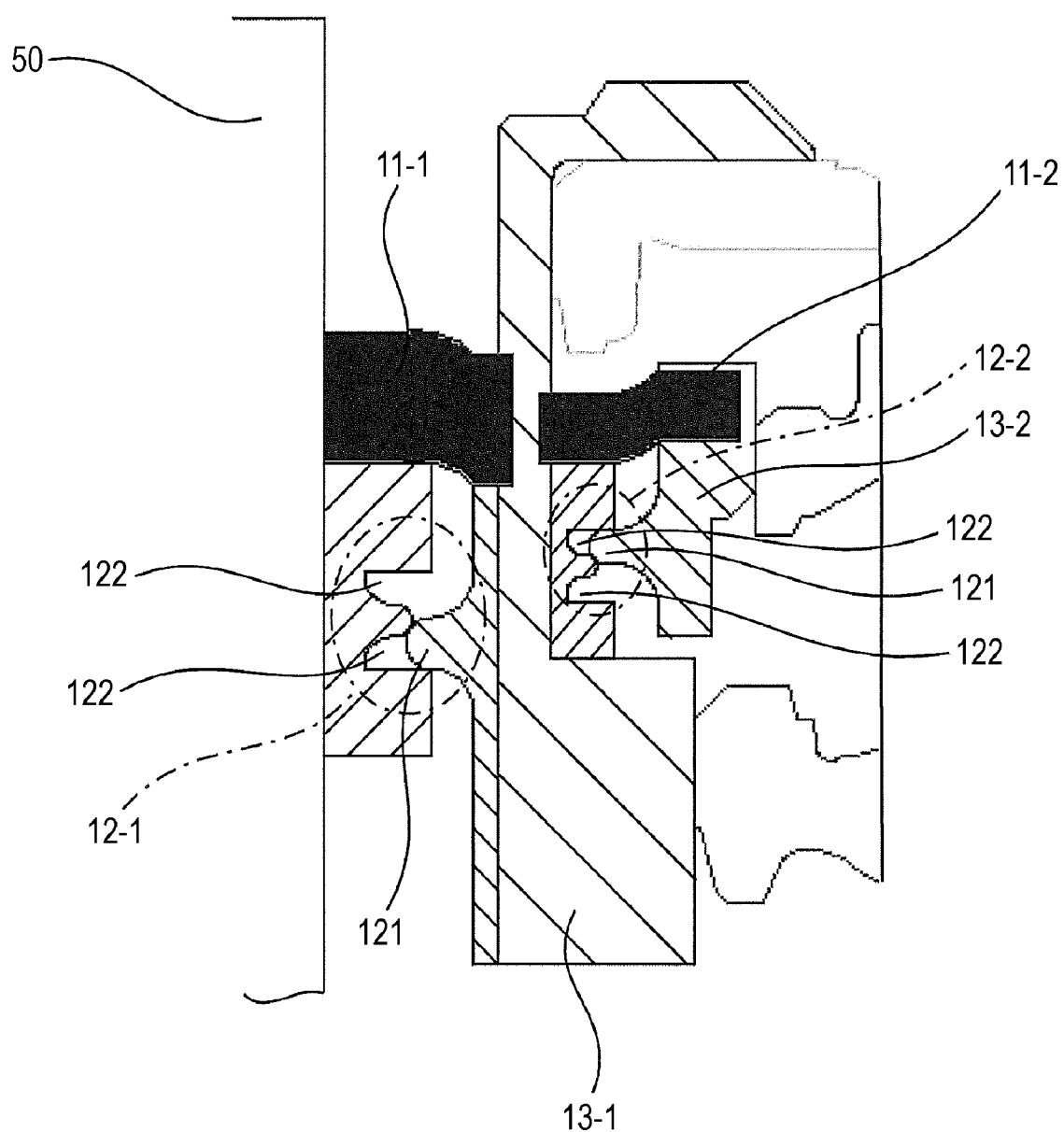
FIG. 17 is a partial cross-sectional view showing an example in which two pairs of holding sections and an ion-conducting polymer actuator form a double structure.

FIGS. 16 and 17 describe other examples of the structure of each of the holding sections formed on the side surface of the enclosure. FIG. 16 shows an example in which the holding section has multiple holding positions. That is, for example, three recesses 122 are provided in accordance with the driving stroke of the ion-conducting polymer actuator 11. In the configuration in which each of the protrusions 121 on the lens holder 13 gets in any of the three recesses 122, there are multiple positions corresponding to the three recesses 122 where the lens holder 13 is held. That is, the focus position of the lens can be switched among the three focus positions.

While the number of positions where the lens holder 13 is held is three in the above example, more recesses 122 may be provided as necessary to set a greater number of positions where the lens holder 13 is held. Further, the structure of each of the holding sections 12 is not limited to the structure shown in FIG. 16, but may be any of the structures shown in FIGS. 9 to 13.

FIG. 17 shows an example in which two pairs of holding sections and an ion-conducting polymer actuator form a double structure. The structure includes an outer lens holder 13-1 and an inner lens holder 13-2. An outer ion-conducting polymer actuator 11-1 drives the outer lens holder 13-1, and an inner ion-conducting polymer actuator 11-2 drives the inner lens holder 13-2.

That is, the outer ion-conducting polymer actuator 11-1 is disposed between the enclosure 50 and the outer lens holder 13-1. The inner ion-conducting polymer actuator 11-2 is disposed between the inner wall of the outer lens holder 13-1 and the inner lens holder 13-2.

Therefore, when the outer ion-conducting polymer actuator 11-1 drives the outer lens holder 13-1, the outer lens holder 13-1 along with the inner lens holder 13-2 is moved forward or backward along the optical axis direction. On the other hand, when the inner ion-conducting polymer actuator 11-2 drives the inner lens holder 13-2, only the inner lens holder 13-2 is moved forward or backward along the optical axis direction. That is, the outer ion-conducting polymer actuator 11-1 drives the entire lens, and the inner ion-conducting polymer actuator 11-2 drives part of the lens.

Each of the protrusions 121 provided on the outer circumferential surface of the outer lens holder 13-1 and the corresponding recesses 122 provided on the inner wall of the enclosure 50 form an outer holding section 12-1. Further, each of the protrusions 121 provided on the outer circumferential surface of the inner lens holder 13-2 and the corresponding recesses 122 provided on the inner wall of the outer lens holder 13-1 form an inner holding section 12-2. Each of the outer holding sections 12-1 maintains the position of the outer lens holder 13-1 stepwise in accordance with the positions and the number of the corresponding recesses 122, and each of the inner holding sections 12-2 maintains the position of the inner lens holder 13-2 stepwise in accordance with the positions and the number of the corresponding recesses 122.

The thrust force of the outer ion-conducting polymer actuator 11-1 and the holding force of each of the outer holding sections 12-1 are set significantly greater or smaller than the thrust force of the inner ion-conducting polymer actuator 11-2 and the holding force of each of the inner holding sections 12-2.

The double structure described above allows the outer and inner lens holders 13-1 and 13-2 to be moved, whereby, for example, not only can the normal mode and the macro-imaging mode be switched, but also a lens magnification switching mechanism can be incorporated. That is, the shift of the outer lens holder 13-1, which is the shift of the entire lens, is used to switch the imaging mode between the normal mode and the macro-imaging mode. On the other hand, the shift of the inner lens holder 13-2, which is the shift of part of the entire lens, is used to switch the magnification. It is noted that the structures of the holding sections 12-1 and 12-2 are not limited to the structures shown in FIG. 17, but each of the structures of the holding sections 12-1 and 12-2 may be any of the structures shown in FIGS. 9 to 13.

5. Advantages of Embodiments

In a lens module of related art, a coiled spring, a flat spring, or any other suitable component is used to press a lens holder along the optical axis so that the lens holder is maintained in the focus position corresponding to the normal mode or the macro-imaging mode, and an ion-conducting polymer actuator is used to drive the lens holder in the direction against the spring force. In this case, to maintain the lens holder in the focus position on the side against the spring force, it is necessary to keep applying electric power to the ion-conducting polymer actuator, resulting in increase in power consumption. Further, when the lens holder is held in the focus position on the side against the spring force for a long period, instability of shape maintaining capability of the actuator due to charge leakage or other factors may cause unbalance between the spring force and the thrust force of the actuator and hence the lens holder may not be held in a fixed position.

For example, in a configuration in which a spring force is used to secure the lens holder in the focus position corresponding to infinity whereas an ion-conducting polymer actuator is used to hold the lens holder in the focus position corresponding to the macro-imaging mode, an image tends to be out of focus in the macro-imaging mode, in which the depth of field is shallow, resulting in the following phenomena: a barcode, which is a popular subject in the macro-imaging mode, may not be recognized, and an out-of-focus image (what is called a blurred image) is obtained even if the user is confident of having captured an in-focus image.

In the present embodiment, the above problems, the lens holder driving electric power consumption problem and the position maintaining problem, can be solved. Further, in the present embodiment, there will be no discrepancy between the position of the lens holder and a chosen mode because the lens holder is driven in response to a mode choosing instruction (mode selection clock, for example) issued when the normal mode or the macro-imaging mode is chosen.

Specifically, the present embodiment can provide the following advantages:

(1) Since electric power only needs to be applied to the ion-conducting polymer actuator only when the mode is switched, electric power consumption necessary for the driving operation can be lower than that necessary in related art.
(2) The driving source can be formed of only one actuator using an ion-conducting polymer actuator, a bimorph piezoelectric device, or any other suitable piezoelectric device.
(3) Since the holding section can mechanically determine the position of the lens holder, the reproducibility and stability of the position of the lens holder can be higher than those in related art.
(4) The structure can be simpler than that in related art, which is advantageous in size reduction and assembly.
(5) No guide shaft is necessary to move a lens.
(6) Only one pattern of instruction (lens driving clock) is necessary to switch the imaging mode between the normal mode and the macro-imaging mode irrespective of the position of the lens. That is, the user will not read a barcode in the normal mode by mistake, which may happen in a manual operation, or it is not necessary to skillfully avoid such a mistake.

6. Example of Electronic Apparatus

Figure 18:
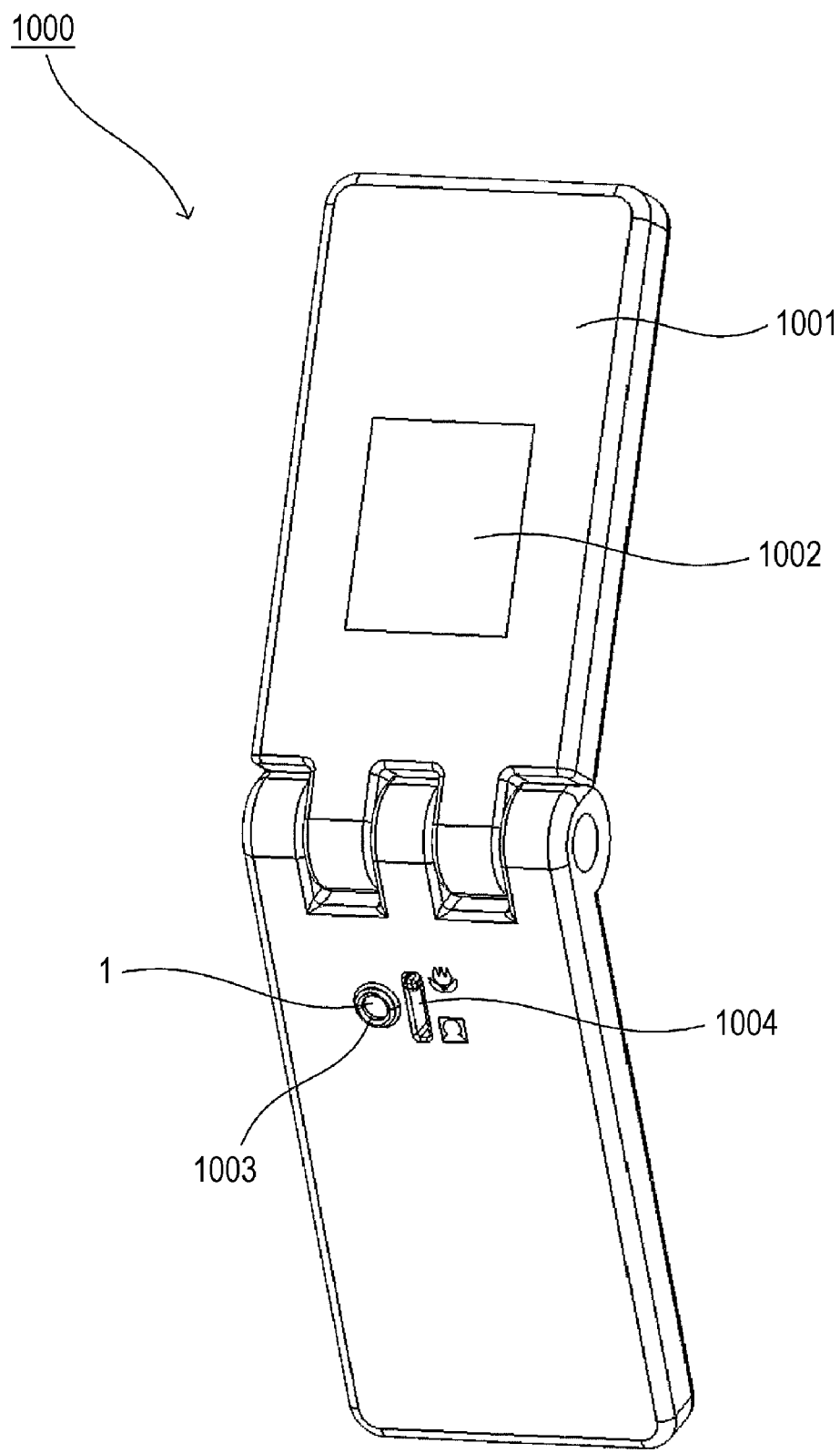
FIG. 18 describes a mobile phone, which is an example of an electronic apparatus to which the lens module of the present embodiment is applied.

FIG. 18 describes a mobile phone, which is an example of an electronic apparatus to which the lens module of the present embodiment is applied. A mobile phone 1000 includes a body housing 1001 that not only includes a display 1002, a dial key (not shown), a microphone (not shown), and a speaker (not shown) but also houses a variety of circuits including a communication circuit. The display 1002 may be disposed on the front side and the rear side or only on the front side. The dial key may be a hardware key or a software key displayed on the display 1002.

In recent years, many models are equipped with a camera function. In the example shown in FIG. 18, the body housing 1001 has a lens aperture 1003 and houses the lens module 1. A slide switch 1004 for switching the imaging mode between the normal mode and the macro-imaging mode is provided in the vicinity of the lens aperture 1003. In response to the operation of the slide switch 1004, the lens in the lens module 1 moves forward or backward along the optical axis direction so that the focus position is switched between those corresponding to the normal mode and the macro-imaging mode.

The lens module 1 of the present embodiment is used to achieve the camera function of the mobile phone 1000. Therefore, when the slide switch 1004 is switched, the controller controls the drive circuit in such a way that a voltage having a predetermined polarity is applied to the ion-conducting polymer actuator in the lens module 1.

Using the lens module 1 of the present embodiment allows the position of the lens to be switched by providing the controller with an electric signal notifying that the slide switch 1004 has been operated. That is, since the position of the lens can be switched without any a mechanical mechanism for transmitting the operation of the slide switch 1004 to the lens, the mechanism can be simplified. Further, since no mechanical mechanism for transmitting the operation of the slide switch 1004 to the lens is necessary, the body housing 1001 can be more watertight.

In the present embodiment, while the slide switch 1004 provided on the body housing 1001 is used to switch the imaging mode between the normal mode and the macro-imaging mode, software processing may be used to switch the imaging mode. That is, a software program for receiving the result of the switching operation between the normal mode and the macro-imaging mode is executed, and the dial key or any other suitable component is used to select an instruction button on the display 1002. The software program then receives the result of the selection operation and sends an instruction to the controller for controlling the ion-conducting polymer actuator, and the controller controls the drive circuit. This configuration eliminates the need for the slide switch 1004, whereby the number of parts can be reduced and the watertightness can be further enhanced because no hole in the body housing 1001 is necessary to place the slide switch 1004.

The lens module 1 of the present embodiment, which has been applied to the mobile phone 1000 in the above description, is also applicable to other electronic apparatus.

The present application contains subject matter related to that disclosed in Japanese Priority Patent Application JP 2008-237672 filed in the Japan Patent Office on Sep. 17, 2008, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A lens module comprising:
an optical element that focuses a subject on an imaging device;
a driver that moves the optical element forward and backward along the optical axis direction when electric power is applied; and
a holding section having a first recess and a second recess at different positions along the optical axis direction, the holding section configured to hold the optical element in a first focus position corresponding to the first recess and a second focus position corresponding to the second recess.

2. A lens module comprising:
an optical element to focus a subject on an imaging device;

a driver to move the optical element forward and backward along the optical axis direction when electric power is applied; and a holding section to hold the optical element in at least two positions along the optical axis direction when the driver moves the optical element forward and backward, wherein, the force produced by the holding section and used to hold the optical element is smaller than a driving force produced by the driver when electric power is applied thereto, whereas the holding force is greater than a restoring force of the driver produced when the electric power application to the driver is terminated.

3. The lens module according to claim 1, wherein the holding section includes a protrusion provided on the outer circumferential surface of the optical element that moves forward and backward or the outer circumferential surface of a holder that holds the optical element, and at least two recesses provided on the inner circumferential surface of an enclosure that houses the optical element or the holder in the positions facing the protrusion.

4. The lens module according to claim 1, wherein the optical element or the holder that holds the optical element is attached into a hole provided in the driver by using insert molding.

5. The lens module according to claim 1, further comprising a controller controlling electric power supplied to the driver in accordance with an external instruction.

6. The lens module according to claim 1, wherein the first focus position corresponds to a normal mode, and the second focus position corresponds to a macro-imaging mode.

7. The lens module according to claim 1 or 2, wherein the driver includes a piezoelectric device the displacement direction of which is controlled by the change in polarity of the voltage applied to the driver.

8. An electronic apparatus comprising:

a lens module including (a) an optical element to focus a subject on an imaging device, (b) a driver to move the optical element forward and backward along the optical axis direction when electric power is applied, and (c) a holding section having a first recess and a second recess at different positions along the optical axis direction, the holding section being configured to hold the optical element in a first focus position corresponding to the first recess and a second focus position corresponding to the second recess a body housing to which the lens module it attached; and an input unit provided on the body housing, the input unit receiving an instruction to supply electric power to the driver in the lens module.

* * * * *